Aug. 5, 1941.                P. BOURQUE                2,251,779
                           ELECTRODE HOLDER
                          Filed May 6, 1940
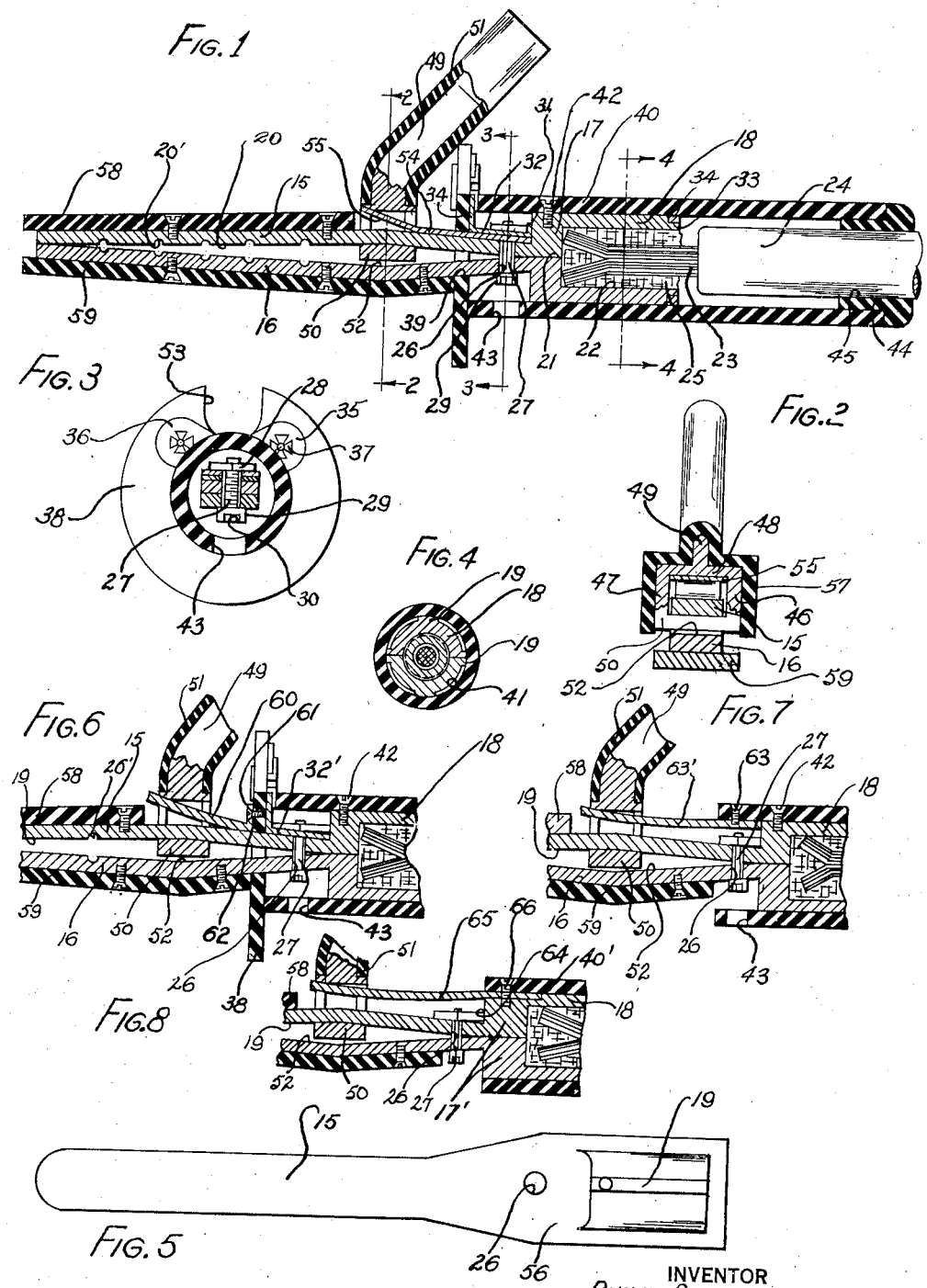

Patented Aug. 5, 1941

2,251,779

UNITED STATES PATENT OFFICE 2,251,779

ELECTRODE HOLDER

Philip Bourque, Detroit, Mich., assignor to Borden Mfg. Co., Inc., Detroit, Mich., a corporation of Michigan Application May 6, 1940, Serial No. 333,623

13 Claims. (Cl. 219—8)

My invention relates to a new and useful improvement in an electrode holder adapted for use particularly in arc welding operations.

It is an object of the present invention to provide a holder of this class which will be simple in structure, economical of manufacture, durable, compact, light, non-rattling, highly efficient in use and one in which heating of the handle will be reduced to a minimum.

Another object of the invention is the provision of an electrode holder having a pair of gripping jaws attached to the end of a cable and provided with a hollow handle through which the cable is directed and having means for maintaining the cable in spaced relation to the handle.

In the electrode I provide a pair of jaw forming plates which are secured together at one of their ends and which are adapted to be sprung apart at their opposite ends for the reception of an electrode wire which is to be clamped between the same. These jaws are bowed intermediate their ends. A rockable member is inserted between these jaws adjacent their connected ends so that upon a rocking thereof the jaws may be sprung apart at their free ends. Experience has shown that in the use of such a handle the jaws become heated and after a period of use the arc of the individual jaws straightens out somewhat so that the rockable member becomes firmly clamped between the jaws. After this has taken place, a further straightening of the arc will cause the jaws to slightly separate at their free ends. This is an objectionable feature and in order to avoid it the rockable member inserted between the jaws is of less thickness than the space separating the jaws at the point of insertion so that as the arc straightens out the rockable member will not be clamped between jaws and will not form a fulcrum from which the free ends of the jaws may curl outwardly.

When clearance is allowed between the jaws and the rockable member, in order to avoid this objectionable feature the rockable member will rattle when in use. When, even though there is no clearance between this rockable member and the jaws when the jaws are in normally closed position, a rattling of this rockable member will take place when the jaws are sprung apart at their free ends and are gripping an electrode wire. It is an object of the present invention to avoid this rattling and, to this end, I have provided a spring which presses the rockable member into engagement with one face of one of the jaws and maintains it in such engagement.

In this type of electrode handle the space between the jaws forwardly of the rockable member is larger than the space rearwardly of the rockable member. Where clearance is given between the rockable member and the jaws it is desirable that movement of this rockable member from its normal position between the jaws be prevented and it is an object of the present invention to avoid this movement. To this end, I so construct and mount the spring that the rockable member is pressed rearwardly and prevented by the spring from moving forwardly.

I have found that it is desirable to have an adjustment whereby the tension of the jaws at their free ends may be adjusted and regulated. In order to accomplish this I form registering openings through the jaws at a diverging portion thereof. It is desirable that the structure be made as light as possible. It is also advantageous that the width of the jaws be confined within certain limits. It is also necessary that the jaws will not break under repeated flexing or springing apart. The line of flex is, of course, on a line directed through the opening formed in these jaws. To accomplish all of these objects I provide a jaw forming plate having a butt or shank and a forwardly extending elongated jaw forming portion, these parts being connected by a tapered portion so that the body at the line of flex or bend is possessed of greater width to afford the necessary strength. When the opening is formed through the jaws, this increased width will compensate for the inevitable weakening resulting from the formation of the opening therethrough.

It is another object of the invention to provide a structure whereby a single bolt or screw may be used for adjusting purposes as well as for securing the spring in position. Another object of the invention is the provision of an electrode handle of this class having a shank or butt with an adjusting screw or bolt embraced by a tubular handle having an opening formed therein for access to the adjusting screw.

Another object of the invention is the provision in an electrode handle of this class of a shield and a tubular handle in engagement with each other in such a manner that the shield forms an abutment for one end of the handle while the handle serves as a reinforcement for the shield.

Another object of the invention is the provision in an electrode handle of this class of a pair of separable jaws having an adjusting screw projecting therethrough and serving as a support for a shield-bearing bracket.

In assembling the jaw-forming parts together the screw projected therethrough is extended through these parts intermediate their ends and sometimes the parts swivel on the screw so that they do not align in perfect registration. It is an object for the present invention to provide a structure in which this swiveling may be avoided and to this end I provide an annular member which embraces the butt ends.

Other objects will appear hereinafter.

It is recognized that various modifications may be made in the details of structure shown without departing from the spirit of the invention and it is intended that such variations may be embraced herein.

Forming a part of the specification is a drawing, in which:

Fig. 1 is a longitudinal, central, vertical, sectional view of the invention with a part shown in side elevation.

Fig. 2 is a sectional view taken on line 2—2 of Fig. 1.

Fig. 3 is a sectional view taken on line 3—3 of Fig. 1.

Fig. 4 is a sectional view taken on line 4—4 of Fig. 1.

Fig. 5 is a top plan view of one of the jaw-forming members.

Fig. 6 is a fragmentary, vertical, central, longitudinal, sectional view of a modified form of the invention.

Fig. 7 is a fragmentary, central, vertical, longitudinal, sectional view of a further modified form.

Fig. 8 is a fragmentary, longitudinal, central, vertical, sectional view of a further modified form of the invention.

As shown in the drawing, the invention comprises a pair of elongated metal jaw-forming plates 15 and 16 each of which is provided at its end with a head 17 projecting rearwardly from which is a semi-circular shank-forming portion 18 projecting outwardly from the periphery of which are spacing ribs 19. On the inner face 20 of the jaw-forming plates 15 is a plurality of grooves 20' which are adapted to register with each other to form wire receiving spaces. When assembled these jaw-forming plates 15 and 16 are superimposed in registering relation, the heads 17 being in engagement at their face 21 and the edges of the semi-circular extensions 18 being in engagement so that a cylindrical socket 22 is formed for the reception of the bared end 23 of an electric cable 24 or other suitable electrical conductor. In the drawing I have illustrated this end 23 secured in the socket 22 by means of solder 25. Formed in each of the jaw-forming plates 15 and 16 forwardly of the head 17 is an opening 26, these openings being in registration with each other for the reception of a screw or bolt 27 which is projected therethrough and which is provided with a nut 28 threaded thereon. The head 29 of this screw or bolt is provided with a flat faced recess 30 for the reception of a flat faced tool whereby the bolt or screw may be rotated, the nut being held against rotation through engagement with the head in the forms shown in Figs. 6, 7 and 8, and, in Fig. 1, through engagement with the angularly turned portion 31 of the bracket 32.

It will be noted that the jaw-forming plates 15 and 16 are bow-shaped intermediate their ends and that the openings 26 are formed through these plates 15 and 16 at a portion which diverges. The jaw-forming plates 15 and 16 are formed from metal possessed of resiliency so that a threading of the nut 28 on to or off of the screw or bolt 27 will effect an adjustment of the tension of the jaws at their free ends.

In assembling these parts, the jaws 15 and 16 sometimes rotate on the bolt or screw 27 as a pivot and move out of registration. In order to prevent this, I have cut away a portion of the end of the extension 18 to provide the reduced end portion 33 on which a ring 34 may engage. This ring may, if desired, be a split resilient ring or a complete annulus. When this ring is mounted in position on the reduced extension 33 a rotating of the jaws 15 and 16 on the bolt 27 as a pivot cannot take place.

The bracket 32 has the upwardly turned portion 34 provided with the lateral wings 35 and 36 which are secured by the rivets 37 to a shield 38 formed from insulating material and provided with an opening 39 through which the jaw-forming plates are projected. The bolt or screw 27 extends through an opening formed in the bracket 32 and thus serves as a means of mounting the bracket. The bracket 32 is formed from spring metal and the upwardly directed portion normally extends angularly to the bracket 32.

A handle 40 formed from insulating material is adapted to embrace the shank or butt of the structure, this shank being formed by the heads 17 and the semi-circular extensions 18. The inside diameter of the handle 40 is such as to snugly engage against the ribs 19 so that there is a space 41 lying between the major portion of the shank and the handle 18. As shown in Fig. 1 this handle projects beyond the forward ends of the heads 17 and is in engagement with one face of the shield 38. When slipping the handle on to the shank, the handle is moved into position where it engages the face 38 which is tilted to the axis of the handle and further movement of the handle onto the shank brings the shield into a position extending in a plane substantially vertical to the longitudinal axis of the handle 40 so that the angularly turned portion 34 of the bracket 32 is under tension. This serves to prevent rattling and also to prevent any tendency of lateral displacement of the handle relative to the shank while at the same time the shield and the handle serve to reinforce each other. A screw 42 serves to secure the handle 40 on the shank. This handle is provided with an opening 43 through which a suitable tool may be extended for rotating the bolt 27.

Mounted in the end of the handle 40 is a plug 44 having a bore 45 formed therein of less diameter than the inside diameter of the handle 40 so that the cable 24 is held in spaced relation to the handle 40 and thus the heating of the handle from the cable is reduced to a minimum. The use of this plug also prevents undue strain on the bared portion 23 of the cable. In use the flexing of the cable is retained outside of the handle so that the cable does not flex at the end of the shank. In this way the life of the cable is considerably increased as breaking of the cable at the end of the shank, from frequent flexing at this point, is prevented.

In use it is necessary to spread the jaw-forming plates 15 and 16 at their free ends in order that an electrode wire may be inserted therein. Upon release of the spreading thrust the jaws through their resiliency, will securely clamp the wire electrode and serve as a holder therefor. To accomplish this spreading operation, I provide a stirrup embodying the side members 46 and 47 connected by the cross-head 48 to a stem 49. These side members 46 and 47 are also connected by the rocker bar 50. The stem 49 is inserted into a tube 51 of insulating material, such as fibre, which forms an extension of the stem 49. As shown clearly in Fig. 1, the rocker bar 50 is of less thickness than the space which separates the jaws 15 and 16 at the location of this cross bar 50 so that there is a space or clearance 52 between the cross bar 50 and one of the jaws when the cross bar is held in contact with the other jaw. When the operator grips the handle 40 and presses the trigger downwardly theretoward the rocker bar 50 will be caused to rock and serve to operate as a cam to spread the jaws 15 and 16 apart. The shield 38 is provided with a notch 53 for reception of the tube 51 when the same is pressed downwardly toward the handle 40. Upon release of this downward pressure the jaws will again spring together in response to their resiliency. By providing the clearance 52 a clamping of the rocker bar between the jaws upon a straightening of the arc or body of the jaws is prevented within certain limits.

In order to prevent displacement of the rocker bar and in order to prevent rattling of the same I provide a spring 54 having the upwardly angularly turned portion 55 which is adapted to engage the forward edge of the cross head 48 and maintain the rocker bar 50 elevated into engagement with the inner face of jaw 15 so that rattling is prevented. This spring also exerts a rearward thrust on the cross head 48 so as to prevent forward movement of the rocker bar 50 out of its normal position. As shown in Fig. 1, the bolt 27 extends through the spring 54 and serves as a means for mounting it in position.

As clearly shown in Fig. 5, the elongated jaw-forming plate is connected to the shank by a tapered widened portion 56 so that additional material is provided at the portion at which the opening 26 is formed and thus a breaking of the plate at this portion is avoided. Consequently there is a shank from which extends forwardly a plate portion through which the opening 26 is formed and extending forwardly from which is an elongated narrower resilient jaw-forming plate portion.

In the drawing I have illustrated the sides 46 and 47 as well as the cross head 48 as being covered with a layer 57 of insulating material. I have also indicated the outer faces of the jaws 15 and 16 as covered with layers 58 and 59, respectively, of insulating material.

The structure illustrated in Fig. 6 is substantially the same as illustrated in Fig. 1 except as will be expressly pointed out. The bracket 32 is not provided with an angularly turned portion corresponding to the part 31 in Fig. 1. An inclined spring 60 is provided with an angularly turned end 61 which is attached by a screw 62 to shield 38.

In Fig. 7 I have illustrated a structure in which the shield is dispensed with. A spring 63' is secured at one end by the screw 63 to the overhanging end of the handle 40, this spring serving to engage the cross head 48.

In Fig. 8 I have illustrated the handle 40 as terminating flush with the forward faces 64 of the heads 17'. Lying between the handle and one of the heads 17 is one end of the spring 65 which is secured by the screw 66 and which engages, at its free end, the cross head 48.

In all of the structures illustrated the spring serves to exert a lifting pressure on the stirrup so that it is maintained in snug engagement with one face of one of the jaws and prevented from rattling. In all of these forms this spring also exerts on the cross head 48 a rearward pressure so as to prevent forward movement of the stirrup.

In this way I have provided an electrode holder whereby the various advantages referred to are accomplished and the various disadvantages mentioned are avoided.

What I claim as new is:

1. An electrode holder of the class described, comprising: a cavity-forming portion open at its rear end for the reception of an end of an electric conductor; a pair of elongated resilient jaw-forming plates connected to and projecting forwardly from the forward end of said cavity-forming portion and overlying each other in superimposed relation, said jaws forwardly of said cavity-forming portion being formed arcuate and bowed away from each other; a rockable member extending between said jaws at said bowed portion, said rockable member being of a thickness less than the space separating said jaws and adapted upon rocking movement in one direction for springing said jaws apart; and resilient means normally pressing said rocker member into engagement with the face of one of said jaws and retaining the same in spaced relation to the other.

2. An electrode holder of the class described, comprising: a shank-forming portion adapted for attachment to an electric conductor, a pair of elongated resilient jaw-forming plates connected to and projecting forwardly from the forward end of said shank-forming portion and overlying each other in superimposed relation, said jaws forwardly of said shank-forming portion being formed arcuate and bowed away from each other; a rockable member extending between said jaws at said bowed portion, said rockable member being of a thickness less than the space separating said jaws and adapted upon rocking movement in one direction for springing said jaws apart; and a spring operable for normally retaining said rockable member in engagement with one of said jaws and in spaced relation to the other.

3. An electrode holder of the class described, comprising: a cavity-forming portion open at its rear end for the reception of an electric cable; a pair of elongated resilient jaw-forming plates connected to and projecting forwardly from the forward end of the cavity-forming portion and overlying each other in superimposed relation, said jaws being formed arcuate forwardly of said cavity-forming portion and provided in said arcuate portion with registering openings; a rockable member extending between said jaws forwardly of said openings, said rockable member being of a thickness less than the space separating said jaws and adapted upon rocking movement in one direction for springing said jaws apart; a securing member projected through said openings for securing said jaws together; and resilient means held by said securing means and operative for retaining said rockable member in engagement with a face of one of said jaws and in spaced relation to the other.

4. In an electrode holder of the class described, a structure embodying a shank-forming portion; an elongated metallic resilient jaw-forming portion of less width than said shank-forming portion; and an intermediate body lying between said jaw-forming portion and said shank-forming portion and connecting the same together and being of greater width than said jaw-forming portion.

5. In an electrode holder of the class described, a structure embodying a shank-forming portion; an elongated jaw-forming portion of narrower width than said shank-forming portion; and a plate-like structure positioned between and connecting said jaw-forming portion and said shank-forming portion together, said plate-like portion tapering in width toward said jaw-forming portion.

6. An electrode holder of the class described, comprising: a shank; a pair of resilient jaw-forming members projecting forwardly from said shank in superimposed relation and adapted for being sprung apart for engaging a material therebetween, said jaw-forming portions having registering openings formed therein; a shield extending across said jaw-forming portions adjacent their rear ends; a bracket carried by said shield, a portion of said bracket overlying said openings; and securing means projected through said openings and through said overlying portion of said bracket for securing said jaws together and securing said shield in position thereon.

7. An electrode holder of the class described, comprising: a shank-forming portion adapted for attachment to an electric cable; a pair of elongated resilient jaw-forming members connected to and projecting forwardly from the forward end of said shank and overlying each other in superimposed relation; means for springing said jaws apart at their free ends, said jaws adjacent said shank having registering openings formed therein; a shield; a resilient bracket mounted on said shield and having an angularly-turned end normally inclined to one face of said shield and overlying said openings; a securing member projected through said openings and through said angularly-turned end for securing said jaws together and securing said shield thereon; and a handle mounted on said shank and engaging at one of its ends one face of said shield for retaining said shield in a plane extending vertically to the axis of the handle and retaining said angularly-turned end of said bracket flexed and under strain.

8. An electrode holder of the class described, comprising: a shank adapted for attachment to an electric cable; a pair of elongated resilient jaw-forming members connected to and projecting forwardly from the forward end of said shank and overlying each other in superimposed relation, said jaws forwardly of said shank being bowed outwardly from each other and provided in the bowed portion forwardly of said shank with registering openings; means projecting between said jaws for springing the same apart; a securing member projecting through said openings for securing said jaws together and adjusting the tension thereof; a handle on said shank, one end of said handle enclosing said securing means and having an opening formed therein in registration with said securing means, said securing means being accessible through said opening.

9. An electrode holder of the class described, comprising: a shank adapted for attachment to one end of an electric cable; a pair of elongated resilient jaw-forming members connected to and projecting forwardly from the forward end of said shank and overlying each other in superimposed relation; a rockable member extending between said jaws forwardly of said shank and adapted upon rocking movement in one direction for springing said jaws apart; a shield mounted on said jaws between said shank and said rockable member; and a spring mounted on said shield and engageable with said rockable member for preventing undue movement thereof.

10. An electrode holder of the class described, comprising: a shank adapted for attachment to one end of an electric cable; a pair of elongated resilient jaw-forming members connected to and projecting forwardly from the forward end of said shank and overlying each other in superimposed relation, said jaws forwardly of said shank being bowed outwardly from each other; a rockable member extending between said jaws at the bowed portion and adapted upon rocking movement in one direction for springing said jaws apart, said rockable member being of a thickness less than the distance separating said jaws at the bowed portion; a shield mounted on said jaw between said shank and said rockable member; a spring mounted on said shield and extending forwardly thereof and engageable with said rockable member for normally maintaining said rockable member in engagement with the face of one of said jaws and in spaced relation to the face of the other.

11. In an electrode holder of the class described, a pair of shank-forming members adapted for being positioned in superimposed relation to each other and in engagement with each other at the opposed faces thereof; an elongated jaw-forming plate projecting forwardly from each of said shank-forming members and overlying each other in superimposed relation, said jaws having registering openings formed therein forwardly of said shank-forming portions; a securing member projected through said openings for securing said jaws together and maintaining said shank-forming portions in relative engagement; and a securing member engaging the rear ends of said shank-forming portions for securing the same together.

12. An electrode of the class described, comprising, a pair of separable cavity-forming members adapted for being positioned in superimposed relation to each other and in engagement with each other at their opposed faces to provide a cavity open at one end for the reception of one end of an electric cable; an elongated jaw-forming member projecting forwardly from each of said cavity-forming members and overlying each other in superimposed relation, said jaws having registering openings formed therein forwardly of said cavity-forming portions; a securing member projected through said openings for securing said jaws together and maintaining said cavity-forming portions in relative engagement; and an annular member embracing said cavity adjacent the open end thereof for securing said cavity-forming portions in fixed relation.

13. An electrode holder of the class described, comprising: a shank adapted for attachment to one end of an electric cable; a pair of elongated resilient jaw-forming members connected to and projecting forwardly from the forward end of said shank and overlying each other in superimposed relation, said jaws, forwardly of said shank, being bowed outwardly from each other; a rockable member extending between the bowed portion of said jaws and adapted upon rocking movement in one direction for springing said jaws apart, said rockable member being of a thickness less than the distance separating said jaws at said bowed portion; a handle on said shank; and a spring connected to said handle and projecting forwardly from said shank and engageable with said rockable member for normally retaining said rockable member in engagement with one of said jaws and in spaced relation to the other.

PHILIP BOURQUE.